US010205529B2

(12) United States Patent
Gyoten et al.

(10) Patent No.: US 10,205,529 B2
(45) Date of Patent: Feb. 12, 2019

(54) LIGHT SOURCE MODULATION CIRCUIT, LIGHT SOURCE MODULATION METHOD, AND PROJECTOR APPARATUS

(71) Applicant: Panasonic Intellectual Property Management Co., Ltd., Osaka (JP)

(72) Inventors: Takaaki Gyoten, Hyogo (JP); Akiyoshi Yamaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/997,019

(22) Filed: Jun. 4, 2018

(65) Prior Publication Data

US 2018/0367218 A1    Dec. 20, 2018

(30) Foreign Application Priority Data

Jun. 19, 2017   (JP) .................................. 2017-119545

(51) Int. Cl.
*H04B 10/516* (2013.01)
*H04B 10/524* (2013.01)
*H04B 10/54* (2013.01)

(52) U.S. Cl.
CPC ....... *H04B 10/5161* (2013.01); *H04B 10/524* (2013.01); *H04B 10/541* (2013.01)

(58) Field of Classification Search
CPC . H04B 10/5161; H04B 10/541; H04B 10/524
See application file for complete search history.

(56) References Cited

U.S. PATENT DOCUMENTS

| 5,161,151 A | * | 11/1992 | Kimura | ..................... H04L 1/24 340/3.1 |
| 9,134,597 B2 | * | 9/2015 | Mizuno | ................ G03B 21/206 |
| 2002/0130944 A1 | * | 9/2002 | Ema | ................... H04N 1/40037 347/132 |

(Continued)

FOREIGN PATENT DOCUMENTS

| JP | 3-230638 | 10/1991 |
| JP | 2001-313813 | 11/2001 |

(Continued)

*Primary Examiner* — David C Payne
*Assistant Examiner* — Omar S Ismail
(74) *Attorney, Agent, or Firm* — Wenderoth, Lind & Ponack, L.L.P.

(57) ABSTRACT

A light source modulation circuit includes a pulse width modulator (PWM) PWM-modulating an input PWM carrier signal according to an input on-time ratio signal to output a PWM-modulated signal, a frequency divider circuit frequency-dividing the PWM carrier signal at a predetermined frequency division ratio to output a communication carrier signal, a communication modulator modulating the communication carrier signal according to an input communication modulation code to output a communication modulation signal, an operational circuit performing a logical AND operation of the PWM-modulated signal and the communication modulation signal to output a resulting signal of the operation as a light source modulation signal, and a light source drive circuit generating a light source drive signal based on the light source modulation signal.

12 Claims, 5 Drawing Sheets

(56) References Cited

U.S. PATENT DOCUMENTS

| | | | | |
|---|---|---|---|---|
| 2002/0158965 | A1* | 10/2002 | Ema | H04N 1/053 347/250 |
| 2003/0095085 | A1* | 5/2003 | Abe | G09G 3/2092 345/74.1 |
| 2004/0183891 | A1* | 9/2004 | Ishida | H04N 1/40037 347/239 |
| 2005/0068335 | A1* | 3/2005 | Tretter | G09G 3/007 345/619 |
| 2007/0195408 | A1* | 8/2007 | Divelbiss | G02B 26/008 359/462 |
| 2008/0255796 | A1* | 10/2008 | Takeuchi | G01P 3/481 702/147 |
| 2011/0080397 | A1* | 4/2011 | Yamamoto | G09G 3/342 345/214 |
| 2011/0128303 | A1* | 6/2011 | Yonemaru | H05B 33/0827 345/690 |
| 2012/0038892 | A1* | 2/2012 | Kurtz | H04N 9/3105 353/31 |
| 2014/0022516 | A1 | 1/2014 | Mizuno | |
| 2014/0062328 | A1* | 3/2014 | Toyooka | H05B 33/0866 315/210 |
| 2014/0086590 | A1* | 3/2014 | Ganick | G06Q 30/02 398/118 |
| 2015/0036057 | A1* | 2/2015 | Richards | H04N 9/3126 348/758 |

FOREIGN PATENT DOCUMENTS

| | | |
|---|---|---|
| JP | 2009-300931 | 12/2009 |
| JP | 2014-21235 | 2/2014 |

* cited by examiner

LIGHT SOURCE MODULATION CIRCUIT, LIGHT SOURCE MODULATION METHOD, AND PROJECTOR APPARATUS

BACKGROUND

1. Technical Field

The present disclosure relates to a light source modulation circuit, a light source modulation method, and a projector apparatus that superimpose communication information on screen information by adjusting the intensity of a light source by pulse width modulation (hereinafter referred to as "PWM") and also on/off modulating the light source.

2. Description of Related Art

Japanese Patent Unexamined Publication No. 2009-300931 discloses, in a laser scanning image display apparatus, a pulse-width modulation signal generation device that modulates the brightness of a laser light source using PWM-modulation according to a display position of an image, to correct variations of brightness depending on the position on the screen. The publication also discloses an image display device furnished with the pulse-width modulation signal generation device as well as a pulse-width modulation signal generation method.

In the pulse-width modulation signal generation device and so forth, a pulse-width modulation signal generating unit is furnished with a phase-locked loop (PLL) and a PWM circuit. The phase-locked loop outputs a ramp wave LS that indicates the period according to the rendering rate when rendering image data PD using a laser diode. The PWM circuit receives image data PD and ramp wave LS, and modulates the duty ratio of the pulse wave with a period determined by ramp wave LS according to image data PD, to generate a pulse-width modulation signal.

There is a projector apparatus that uses a semiconductor light source as the light source, illuminates all the optical modulator elements having a structure including a multiplicity of two-dimensionally arrayed pixels at the same timing, and projects the reflected light or the transmitted light therefrom through a projection lens. A problem with such a projector apparatus is that, when the brightness of the light source is adjusted by PWM and the resulting PWM waveform is on/off modulated according to the information to be transferred, jitters with the on/off modulation waveform according to the information to be transferred occur because of the interference that occurs between the PWM-modulated signal and the on/off modulation signal according to the information to be transferred.

The present disclosure provides a light source modulation circuit and so forth that can prevent occurrence of jitter and that can stably perform information transfer by on/off modulation according to the information to be transferred.

SUMMARY

A light source modulation circuit according to the present disclosure includes:
a pulse width modulator (PWM) PWM-modulating an input PWM carrier signal according to an input on-time ratio signal to output a PWM-modulated signal;
a frequency divider circuit frequency-dividing the PWM carrier signal at a predetermined frequency division ratio to output a communication carrier signal;
a communication modulator modulating the communication carrier signal according to an input communication modulation code to output a communication modulation signal;
an operational circuit performing a logical AND operation of the PWM-modulated signal and the communication modulation signal to output a resulting signal of the operation as a light source modulation signal; and
a light source drive circuit generating a light source drive signal based on the light source modulation signal.

The light source modulation circuit according to the present disclosure can prevent occurrence of jitters and that can stably perform information transfer by on/off modulation according to the information to be transferred.

DETAILED DESCRIPTION

Hereinbelow, exemplary embodiments and comparative examples will be described in detail with reference to the drawings. However, unnecessarily detailed description may be omitted. For example, detailed description of well-known matters and repetitive description of substantially the same structures may be omitted. This is to prevent the following description from becoming redundant and to facilitate understanding for those skilled in the art.

It should be noted that the appended drawings and the following description are provided for those skilled in the art to sufficiently understand the present disclosure, and they are not intended to limit the subject matter set forth in the claims.

First Exemplary Embodiment

Hereinbelow, a first exemplary embodiment will be described with reference to FIGS. 1 to 3.

1-1. Configuration

Figure 1:
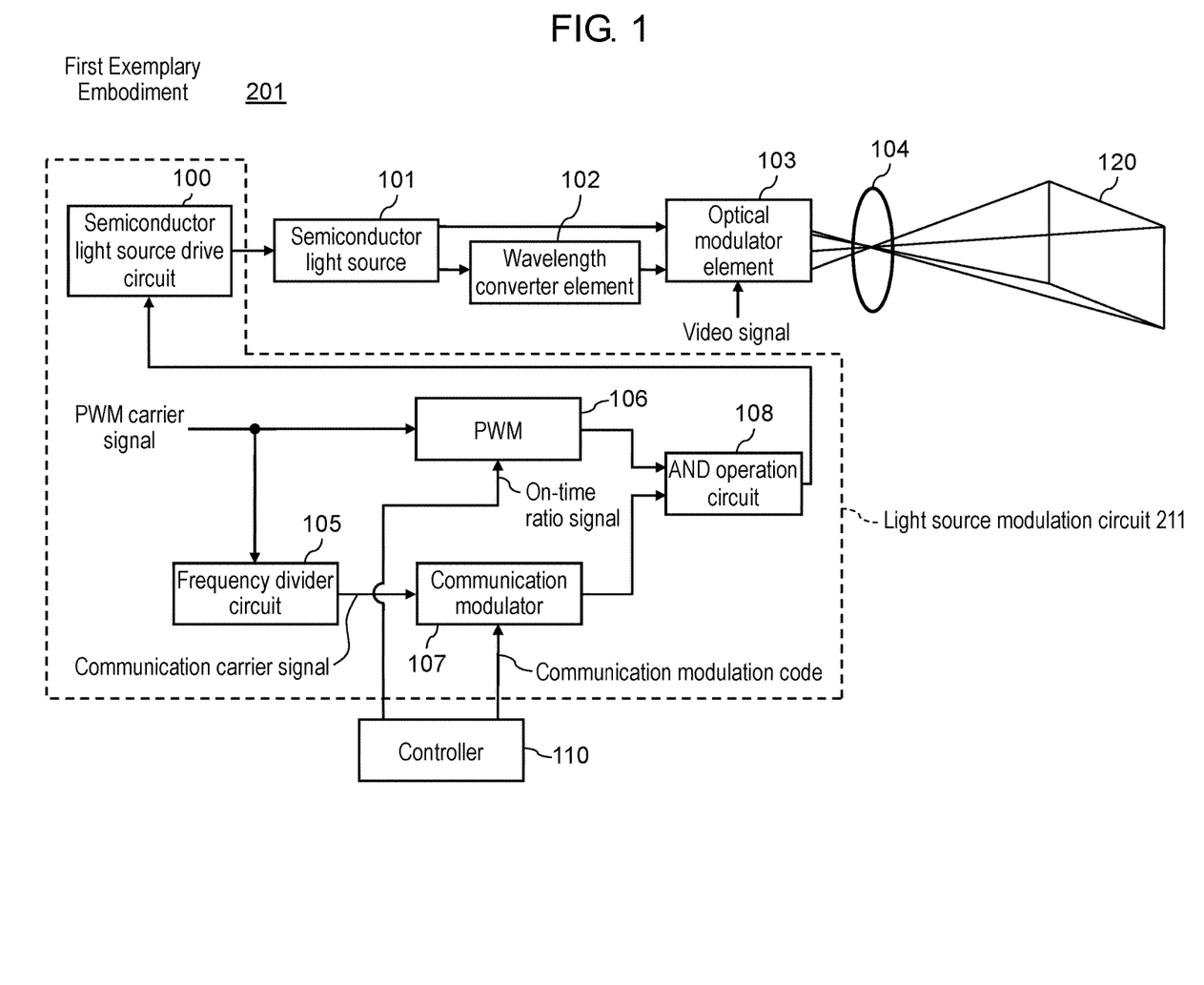
FIG. 1 is a block diagram illustrating an example of the configuration of a projector apparatus furnished with a light source modulation circuit according to a first exemplary embodiment.

FIG. 1 is a block diagram illustrating an example of the configuration of projector apparatus 201 furnished with light source modulation circuit 211 according to the first exemplary embodiment. Referring to FIG. 1, projector apparatus 201 is furnished with light source modulation circuit 211, semiconductor light source 101, wavelength converter element 102, optical modulator element 103, projection lens 104, and controller 110. Here, light source modulation circuit 211 includes frequency divider circuit 105, pulse width modulator (PWM) 106, communication modulator 107, AND operation circuit 108, and semiconductor light source drive circuit 100.

Controller 110 controls the operations of projector apparatus 201 and generates a communication modulation code containing an on-time ratio signal for adjusting the brightness of semiconductor light source 101 and an information signal for being superimposed on a video signal to be projected by projector apparatus 201. The on-time ratio signal is output to PWM 106. The communication modulation code is output to communication modulator 107.

Referring to FIG. 1, the PWM carrier signal and the on-time ratio signal are input to PWM 106. PWM 106 PWM-modulates the PWM carrier signal according to the on-time ratio signal and thereby generates a PWM-modulated signal having the repetition frequency or period of the PWM carrier signal and the on-time ratio of the on-time ratio signal. The PWM-modulated signal is output to AND operation circuit 108. Frequency divider circuit 105 frequency-divides the PWM carrier signal at a predetermined frequency division ratio of, for example, 1/integer, to generate a communication carrier signal in which the frequency of the PWM carrier signal is frequency-divided. The communication carrier signal is output to communication modulator 107. Communication modulator 107 modulates the communication carrier signal that is input from frequency divider circuit 105 according to the communication modulation code that is input from controller 110. This generates a communication modulation signal according to the communication modulation code at the timing according to the cyclic period of the communication carrier signal. The communication modulation signal is output to AND operation circuit 108. AND operation circuit 108 performs a logical AND operation of the PWM-modulated signal that is input from PWM 106 and the communication modulation signal that is input from communication modulator 107, and outputs a resulting signal of the operation to semiconductor light source drive circuit 100 as a light source modulation signal.

Semiconductor light source drive circuit 100 generates an on/off signal, which is a light source drive signal, according to the light source modulation signal that is input from AND operation circuit 108. The on/off signal, which is the light source drive signal, is output to semiconductor light source 101 to drive semiconductor light source 101. Semiconductor light source 101 is driven according to the on/off signal that is input from semiconductor light source drive circuit 100, and semiconductor light source 101 generates an optical signal according to the driving and outputs the optical signal to optical modulator element 103 and wavelength converter element 102. Wavelength converter element 102 converts the wavelength of the optical signal that is input thereto into a predetermined wavelength and outputs the resulting signal to optical modulator element 103. Optical modulator element 103 intensity-modulates the two input signals according to the input video signal. Thus, the intensity-modulated optical signals are projected onto projection surface 120 via projection lens 104.

1-2. Operations

The operations of light source modulation circuit 211 configured as described above will be explained below with reference to FIGS. 1 to 3.

Figure 2:
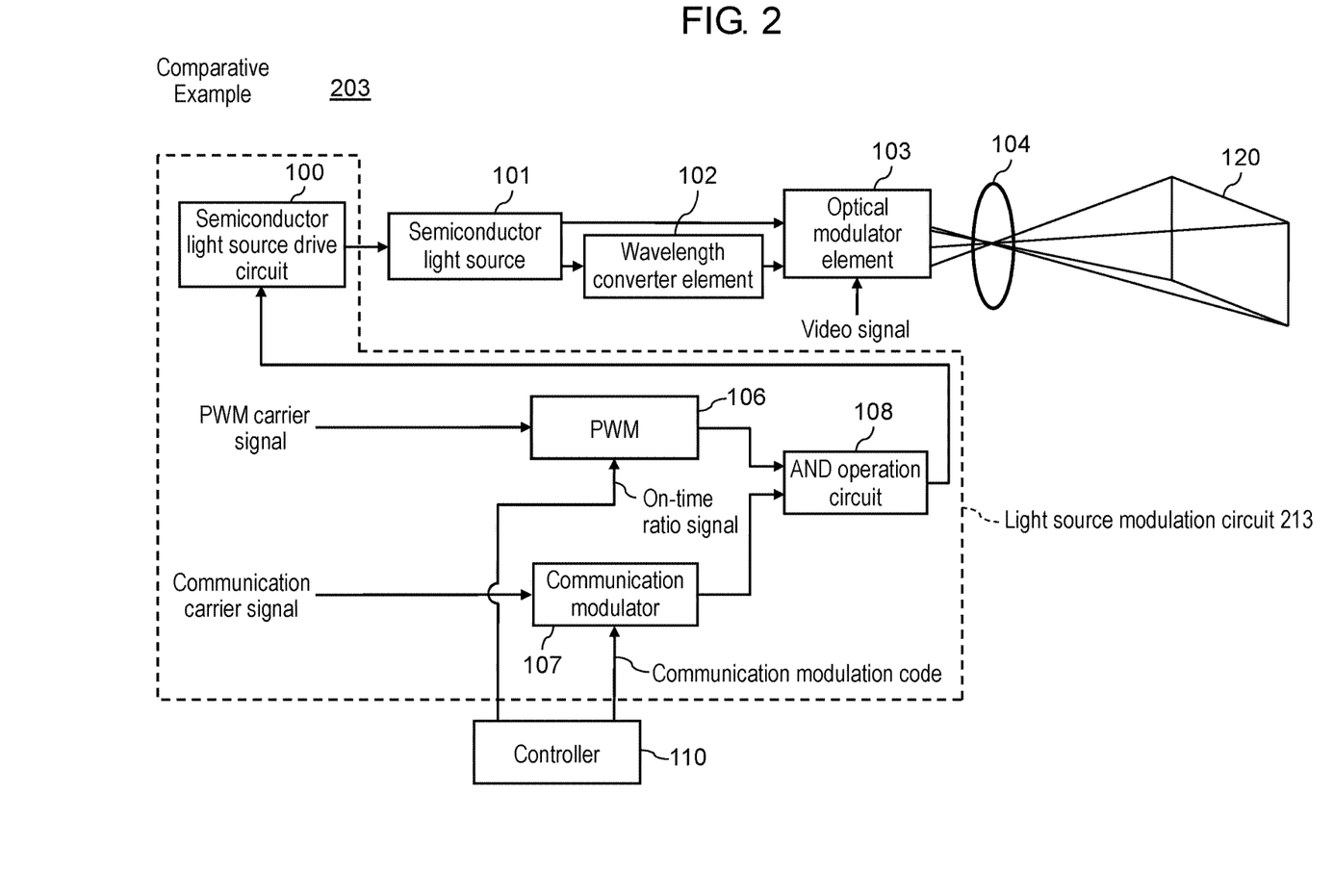
FIG. 2 is a block diagram illustrating an example of the configuration of a projector apparatus furnished with a light source modulation circuit according to a comparative example.
Figure 3:
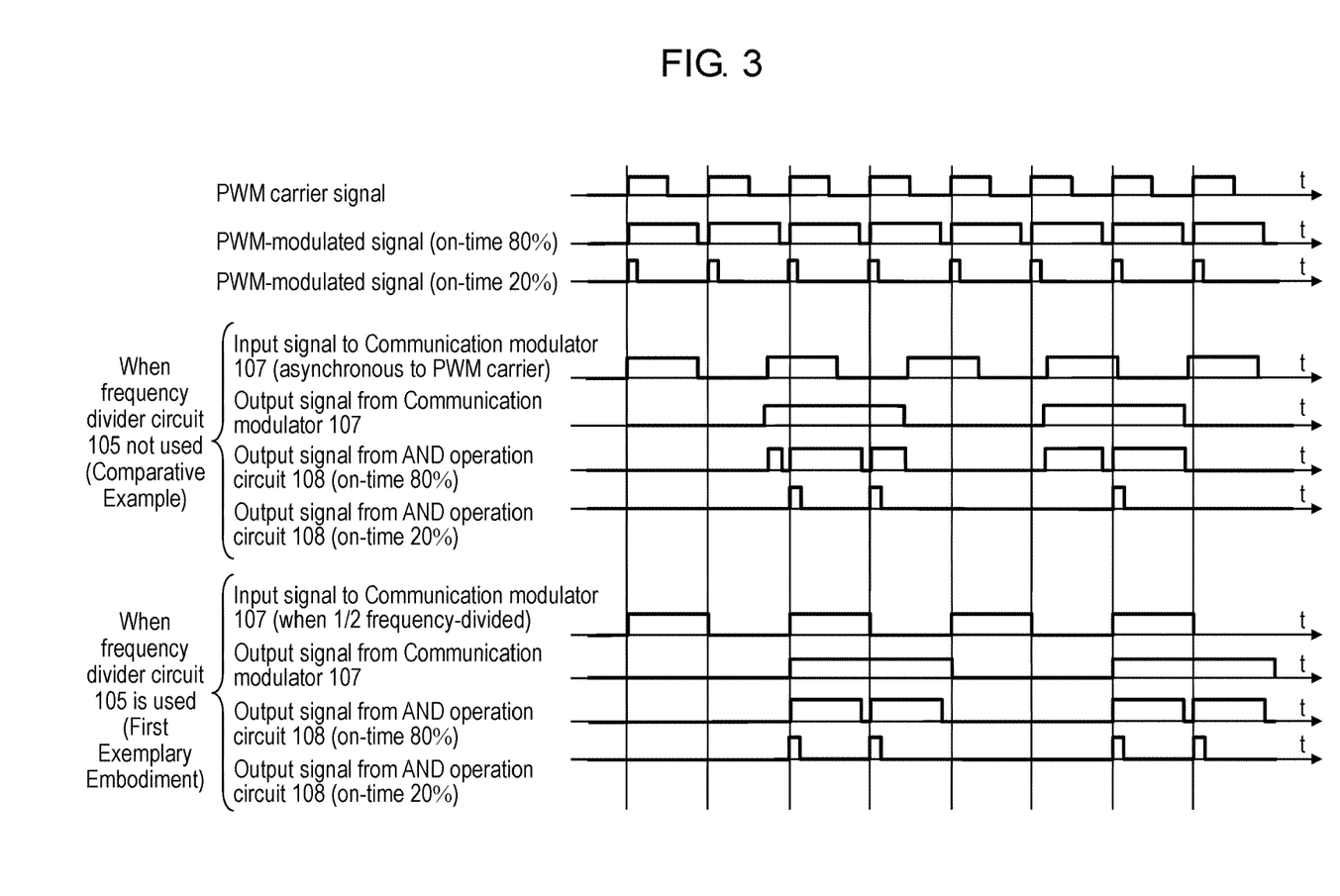
FIG. 3 is a timing chart of various signals, illustrating an example of the operations of the light source modulation circuits according to the comparative example and the first exemplary embodiment.

FIG. 2 is a block diagram illustrating an example of the configuration of projector apparatus 203 furnished with light source modulation circuit 213 according to a comparative example, and FIG. 3 is a timing chart of various signals, illustrating an example of the operations of light source modulation circuits 211 and 213 according to the first exemplary embodiment and the comparative example. As illustrated in FIGS. 1 and 2, light source modulation circuit 211 according to the first exemplary embodiment includes frequency divider circuit 105, but light source modulation circuit 213 according to the comparative example does not include frequency divider circuit 105.

In light source modulation circuit 213 according to the comparative example, which is shown in FIG. 2, PWM 106 PWM-modulates the PWM carrier signal according to the on-time ratio signal, to generate a PWM-modulated signal having the repetition frequency (or period) and the on-time ratio of the PWM carrier signal. The upper part of FIG. 3 shows the PWM carrier signal, a PWM-modulated signal (on-time 80%) with an on-time ratio of 80%, and a PWM-modulated signal (on-time 20%) with an on-time ratio of 20%. In light source modulation circuit 213 according to the comparative example, communication modulator 107 modulates a communication carrier signal according to a communication modulation code. This generates a communication modulation signal according to the communication modulation code at the timing according to the cyclic period of the communication carrier signal.

First, an example of the operation of light source modulation circuit 213 according to the comparative example will be described below with reference to a set of signals denoted as "when frequency divider circuit 105 not used (comparative example)", shown in the middle part of FIG. 3.

An input signal to communication modulator 107 (asynchronous to PWM carrier), which is the communication carrier signal, is asynchronous to the PWM carrier signal, which is shown in the upper part of FIG. 3. An output signal from communication modulator 107 when using such a communication carrier signal is represented as an output signal from communication modulator 107 in the middle part of FIG. 3. The outputs from AND operation circuit 108 that are generated from the output signal from communication modulator 107 and from the PWM-modulated signal (on-time 80%) and the PWM-modulated signal (on-time 20%), which are shown in the upper part of FIG. 3, are represented as an output signal from AND operation circuit 108 (on-time 80%) and an output signal from AND operation circuit 108 (on-time 20%) in the middle part of FIG. 3.

In the output signal from AND operation circuit 108 (on-time 80%) of light source modulation circuit 213 according to the comparative example, a difference in timing arises between the off-time of the PWM-modulated signal (on-time 80%) and the on-time of the output signal from communication modulator 107, and consequently, a shift occurs in the barycentric position of the pulse of the output signal from AND operation circuit 108 (on-time 80%). That is, jitters with the on/off modulation waveform according to the information to be transferred occur in the output signal from AND operation circuit 108 (on-time 80%). In other words, a timing shift occurs between the off-time of the PWM-modulated signal that is output from PWM 106 and the on-time of the communication modulation signal that is output from communication modulator 107, so jitters occur in the light source modulation signal that is output from AND operation circuit 108. As a consequence, there may be cases in which signals may not be read properly in a subsequent portion to semiconductor light source drive circuit 100. Moreover, similar shifts of barycentric position also occur in the output signal from AND operation circuit 108 (on-time 20%) shown in the middle part of FIG. 3. Furthermore, in this case, the shift of the barycentric position of the pulse is greater because the number of on-times of the PWM-modulated signal (on-time 20%) contained in on-time of the output signal from communication modulator 107 is different. As a consequence, there may be cases in which jitters occur in the light source modulation signal that is output from AND operation circuit 108, and the signal cannot be read properly in a subsequent portion to semiconductor light source drive circuit 100.

Next, an example of the operation of light source modulation circuit 211 according to the first exemplary embodiment will be described below with reference to a set of signals denoted as "when frequency divider circuit 105 is used (first exemplary embodiment)", shown in the lower part of FIG. 3.

In contrast to the foregoing, light source modulation circuit 211 according to the first exemplary embodiment, shown in FIG. 1, has frequency divider circuit 105. Accordingly, frequency divider circuit 105 outputs a communication carrier signal in which the PWM carrier signal is frequency-divided at a predetermined frequency division ratio, to communication modulator 107, as described above. With such a configuration, timing of change is always fixed in the PWM carrier signal and the communication carrier signal, which is input to communication modulator 107. The lower part of FIG. 3 shows an input signal to communication modulator 107 (when ½ frequency-divided), an output signal from communication modulator 107, an output signal from AND operation circuit 108 (on-time 80%), and an output signal from AND operation circuit 108 (on-time 20%) when frequency divider circuit 105 is used. The input signal to communication modulator 107 (when ½ frequency-divided) represents the output signal from frequency divider circuit 105 when the frequency division ratio of frequency divider circuit 105 is ½. The output signal from communication modulator 107 is a signal obtained by modulating the communication carrier signal that is output from frequency divider circuit 105 according to the communication modulation code that is input from controller 110. The output signal from AND operation circuit 108 (on-time 80%) and the output signal from AND operation circuit 108 (on-time 20%) are output signals generated by AND operation circuit 108 from the output signal from communication modulator 107, the PWM-modulated signal (on-time 80%) and the PWM-modulated signal (on-time 20%). When frequency divider circuit 105 is used, timing of change is always fixed in the PWM carrier signal and the communication carrier signal, which is input to communication modulator 107. Therefore, the shift in the barycentric position of pulse, which occurs when frequency divider circuit 105 is not used, does not occur in the output signal from AND operation circuit 108 (on-time 80%) and the output signal from AND operation circuit 108 (on-time 20%). In other words, timing of change is always fixed in the PWM-modulated signal that is output from PWM 106 and the communication modulation signal that is output from communication modulator 107. As a result, it is possible to prevent jitters from occurring in the light source modulation signal that is output from AND operation circuit 108.

1-3. Advantageous Effects

As discussed above, the present exemplary embodiment can prevent "a shift in the barycentric position of the pulse of on/off modulation waveform according to the information to be transferred, that results from the interference between the PWM modulation and the on/off modulation according to the information to be transferred", which is a problem that arises when the brightness of the light source is adjusted by PWM modulation and the resulting PWM waveform is further on/off modulated according to the information to be transferred. In other words, it is possible to prevent jitters from occurring in the light source modulation signal that is output from AND operation circuit 108 because of the interference that occurs between the PWM-modulated signal that is output from PWM 106 and the communication modulation signal that is output from communication modulator 107. This makes it possible to provide light source modulation circuit 211 that can stably perform information transfer by on/off modulation according to the information to be transferred.

Second Exemplary Embodiment

Hereinbelow, a second exemplary embodiment will be described with reference to FIGS. 4 and 5.

2-1. Configuration

Figure 4:
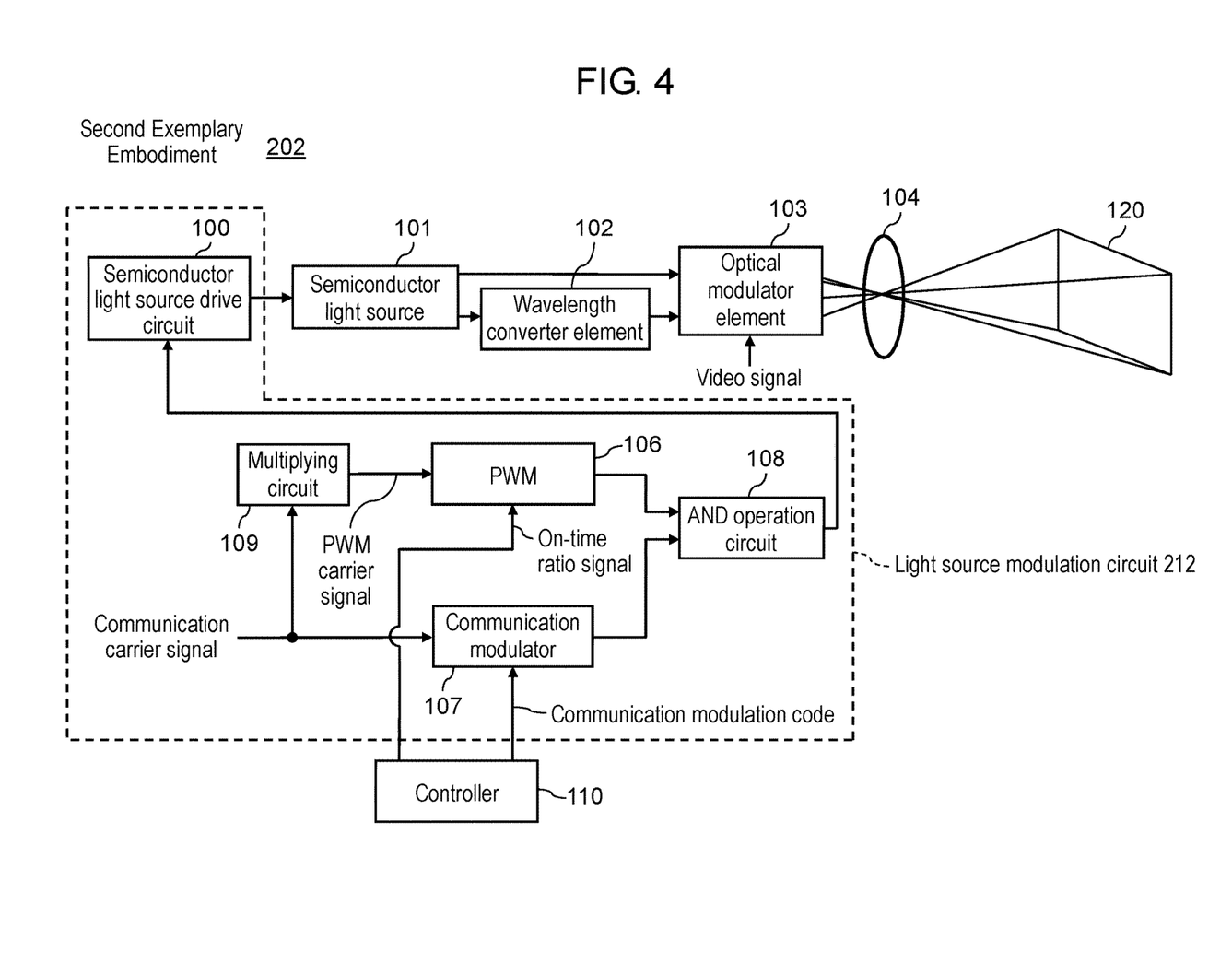
FIG. 4 is a block diagram illustrating an example of the configuration of a projector apparatus furnished with a light source modulation circuit according to a second exemplary embodiment.
Figure 5:
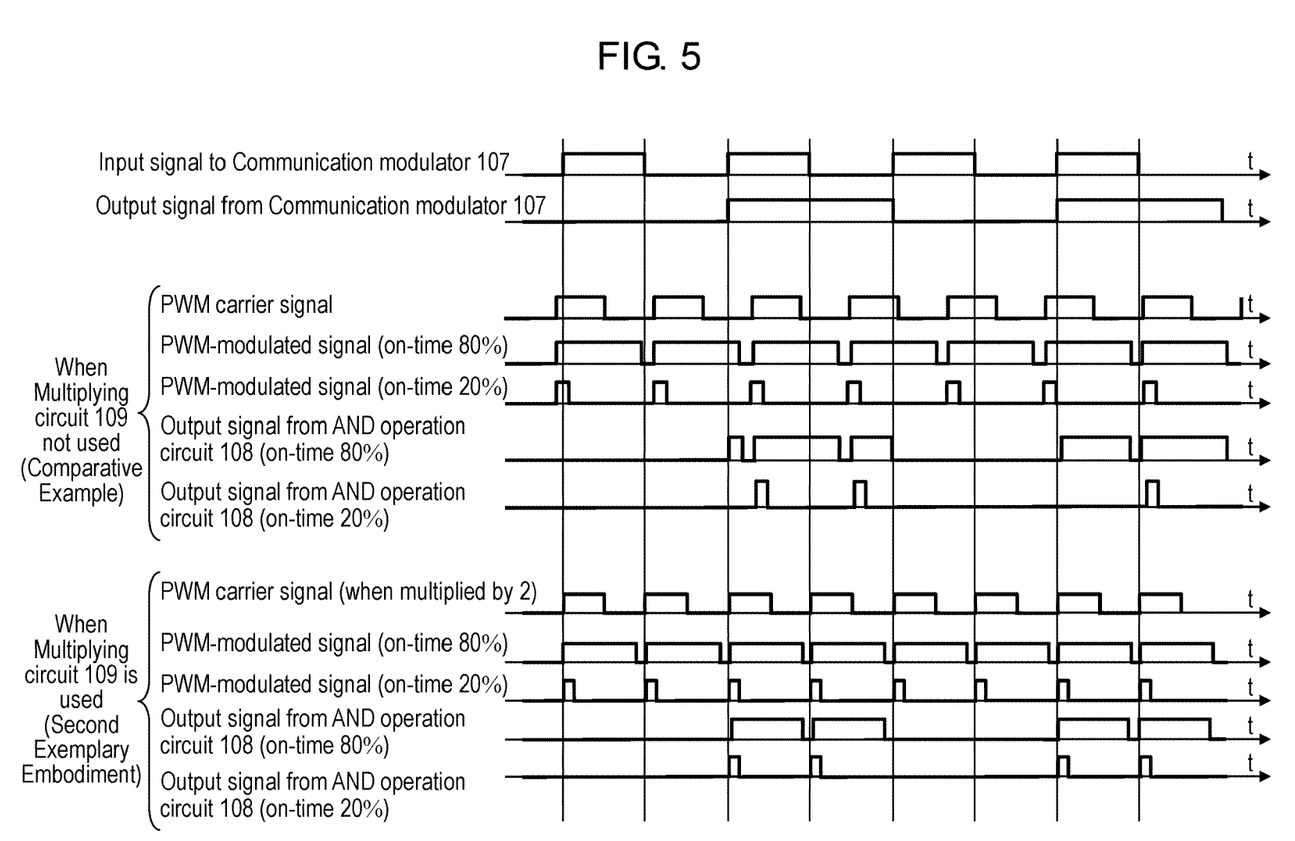
FIG. 5 is a timing chart of various signals, illustrating an example of the operations of the light source modulation circuits according to the comparative example and the second exemplary embodiment.

FIG. 4 is a block diagram illustrating an example of the configuration of projector apparatus 202 furnished with light source modulation circuit 212 according to the second exemplary embodiment, and FIG. 5 is a timing chart of various signals, illustrating an example of the operations of light source modulation circuits 212 and 213 according to the second exemplary embodiment and the comparative example.

Referring to FIG. 4, when compared with light source modulation circuit 211 of FIG. 1, light source modulation circuit 212 according to the second exemplary embodiment is characterized by including multiplying circuit 109 in place of frequency divider circuit 105. In the following, differences will be detailed.

Referring to FIG. 4, multiplying circuit 109 multiplies a communication carrier signal by a predetermined multiplication number to generate a PWM carrier signal, and outputs the PWM carrier signal to PWM 106. Meanwhile, communication modulator 107 modulates the communication carrier signal according to a communication modulation code that is input from controller 110. As a result, communication modulator 107 generates a modulation signal corresponding to the communication modulation code at the timing according to the cycle period of the communication carrier signal and outputs the resulting signal to AND operation circuit 108.

2-2. Operations

The operations of light source modulation circuit 212 configured as described above will be explained below with reference to FIG. 2 and FIGS. 4 to 5.

First, an example of the operation of light source modulation circuit 213 according to the comparative example will be described below with reference to a set of signals denoted as "when multiplying circuit 109 not used (comparative example)", shown in the middle part of FIG. 5.

In light source modulation circuit 213 shown in FIG. 2, communication modulator 107 modulates a communication carrier signal according to the communication modulation code to thereby generate a modulation signal corresponding to the communication modulation code at the timing according to the cycle period of the communication carrier signal. The upper part of FIG. 5 shows an input signal to communication modulator 107, which is a communication carrier signal, and an output signal from communication modulator 107. PWM 106 PWM-modulates the PWM carrier signal according to the on-time ratio signal and thereby generates a PWM-modulated signal having the repetition frequency (or period) and the on-time ratio of the PWM carrier signal. The middle part of FIG. 5 shows the PWM carrier signal, a PWM-modulated signal (on-time 80%) with an on-time ratio of 80%, and a PWM-modulated signal (on-time 20%) with an on-time ratio of 20%. The output signals from AND operation circuit 108 that are generated from the output signal from communication modulator 107, which is shown in the upper part of FIG. 5, and the PWM-modulated signal (on-time 80%) and the PWM-modulated signal (on-time 20%), which are shown in the middle part of FIG. 5, are represented as an output signal from AND operation circuit 108 (on-time 80%) and an output signal from AND operation circuit 108 (on-time 20%) in the middle part of FIG. 5. Here, in the output signal from AND operation circuit 108 (on-time 80%), a difference in timing arises between the off-time of the PWM-modulated signal (on-time 80%) and the on-time of the output signal from communication modulator 107, and consequently, a shift occurs in the barycentric position of the pulse of the output signal from AND operation circuit 108 (on-time 80%). That is, jitters with the on/off modulation waveform according to the information to be transferred occur in the output signal from AND operation circuit 108 (on-time 80%). Moreover, similar shifts of barycentric position also occur in the output signal from AND operation circuit 108 (on-time 20%) shown in the middle part of FIG. 5. Furthermore, in this case, the shift of the barycentric position of the pulse is greater because the number of on-times of the PWM-modulated signal (on-time 20%) contained in on-time of the output signal from communication modulator 107 is different.

Next, an example of the operation of light source modulation circuit 212 according to the second exemplary embodiment will be described below with reference to a set of signals denoted as "when multiplying circuit 109 is used (second exemplary embodiment)", shown in the lower part of FIG. 5.

In contrast to the foregoing, light source modulation circuit 212 according to the second exemplary embodiment, shown in FIG. 4, has multiplying circuit 109. Therefore, the PWM carrier signal is an output signal from multiplying circuit 109. That is, multiplying circuit 109 multiplies the communication carrier signal to generate the PWM carrier signal. With such a configuration, timing of change is always fixed in the communication carrier signal and the PWM carrier signal, which is input to PWM 106. The lower part of FIG. 5 shows a PWM carrier signal (when multiplied by 2), a PWM-modulated signal (on-time 80%), a PWM-modulated signal (on-time 20%), an output signal from AND operation circuit 108 (on-time 80%), and an output signal from AND operation circuit 108 (on-time 20%) when multiplying circuit 109 is used. The PWM carrier signal (when multiplied by 2) represents an output signal from multiplying circuit 109 when the multiplication number of multiplying circuit 109 is 2. The PWM-modulated signal (on-time 80%) and the PWM-modulated signal (on-time 20%) are output signals from PWM 106 when the output signal from multiplying circuit 109 is used as the PWM carrier signal. The output signal from AND operation circuit 108 (on-time 80%) and the output signal from AND operation circuit 108 (on-time 20%) are output signals generated by AND operation circuit 108 from the output signal from communication modulator 107, the PWM-modulated signal (on-time 80%) and the PWM-modulated signal (on-time 20%). The shift in the barycentric position of pulse, which occurs when multiplying circuit 109 is not used, does not occur when multiplying circuit 109 is used.

2-3. Advantageous Effects

The second exemplary embodiment of the present disclosure yields the same advantageous effects as those obtained by the first exemplary embodiment of the present disclosure.

Other Exemplary Embodiments

As described above, the first and second exemplary embodiments have been described as examples of the technology disclosed in the present application. However, the technology of the present disclosure is not limited thereto and may be applied to other embodiments in which modifications, substitutions, additions, and subtractions are made. It is also possible to construct other embodiments by combining various component parts described in the foregoing first and second exemplary embodiments. For example, the first and second exemplary embodiments employ a system that uses wavelength converter element 102, but a system without wavelength converter element 102 is also possible when a light source that directly generates three colors of lights R, G, B is used for semiconductor light source 101.

In a projector apparatus that uses a semiconductor light source as the light source, illuminates all the optical modulator elements with a structure including a multiplicity of two-dimensionally arrayed pixels at the same timing, and projects the reflected light or the transmitted light therefrom through a projection lens, the present discloses is applicable to a light source modulation circuit that adjusts the brightness of the light source by PWM and on/off-modulates the resulting PWM waveform according to the information to be transferred.

What is claimed is:

1. A light source modulation circuit comprising:
   a pulse width modulator (PWM) PWM-modulating an input PWM carrier signal according to an input on-time ratio signal to output a PWM-modulated signal;
   a frequency divider circuit frequency-dividing the PWM carrier signal at a predetermined frequency division ratio to output a communication carrier signal;
   a communication modulator modulating the communication carrier signal according to an input communication modulation code to output a communication modulation signal;
   an operational circuit performing a logical AND operation of the PWM-modulated signal and the communication modulation signal to output a resulting signal of the operation as a light source modulation signal; and
   a light source drive circuit generating a light source drive signal based on the light source modulation signal, wherein
   the communication modulator outputs the communication modulation signal to the operational circuit.

2. A projector apparatus comprising the light source modulation circuit according to claim 1.

3. A light source modulation circuit comprising:
   a communication modulator modulating an input communication carrier signal according to an input communication modulation code to output a communication modulation signal;
   a multiplying circuit multiplying the communication carrier signal by a predetermined multiplication number to output a PWM carrier signal;
   a PWM PWM-modulating the PWM carrier signal according to an input on-time ratio signal to output a PWM-modulated signal;
   an operational circuit performing a logical AND operation of the PWM-modulated signal and the communication modulation signal to output a resulting signal of the operation as a light source modulation signal; and a light source drive circuit generating a light source drive signal based on the light source modulation signal, wherein
the communication modulator outputs the communication modulation signal to the operational circuit.

4. A projector apparatus comprising the light source modulation circuit according to claim 3.

5. A light source modulation method comprising the steps of:
PWM-modulating an input PWM carrier signal according to an input on-time ratio signal to output a PWM-modulated signal;
frequency-dividing the PWM carrier signal at a predetermined frequency division ratio to output a communication carrier signal;
modulating the communication carrier signal according to an input communication modulation code to output a communication modulation signal;
performing a logical AND operation of the PWM-modulated signal and the communication modulation signal to output a resulting signal of the operation as a light source modulation signal;
generating a light source drive signal based on the light source modulation signal; and
outputting the communication modulation signal for the step of performing the logical AND operation of the PWM-modulated signal and the communication modulation signal.

6. A light source modulation method comprising the steps of:
modulating an input communication carrier signal according to an input communication modulation code to output a communication modulation signal;
multiplying the communication carrier signal by a predetermined multiplication number to output a PWM carrier signal;
PWM-modulating the PWM carrier signal according to an input on-time ratio signal to output a PWM-modulated signal;
performing a logical AND operation of the PWM-modulated signal and the communication modulation signal to output a resulting signal of the operation as a light source modulation signal;
generating a light source drive signal based on the light source modulation signal; and
outputting the communication modulation signal for the step of performing the logical AND operation of the PWM-modulated signal and the communication modulation signal.

7. The projector apparatus according to claim 2, wherein the input communication modulation code is generated in response to a projected image projected by the projector apparatus.

8. The projector apparatus according to claim 2, wherein the input communication modulation code superposes a timing of light generated by the light source modulation circuit on a timing of an image signal of a projected image.

9. The projector apparatus according to claim 4, wherein the input communication modulation code is generated in response to a projected image projected by the projector apparatus.

10. The projector apparatus according to claim 4, wherein the input communication modulation code superposes a timing of light generated by the light source modulation circuit on a timing of an image signal of a projected image.

11. The light source modulation method according to claim 5, wherein
the input communication modulation code is generated in response to a projected image projected by the projector apparatus.

12. The light source modulation method according to claim 5, wherein
the input communication modulation code superposes a timing of light generated by the light source modulation circuit on a timing of an image signal of a projected image.

* * * * *